United States Patent [19]
Sjostrom et al.

[11] Patent Number: 6,136,072
[45] Date of Patent: *Oct. 24, 2000

[54] APPARATUS AND METHOD FOR THE REMOVAL OF CONTAMINANTS IN GASES

[75] Inventors: Sharon Sjostrom, Denver, Colo.; Ramsay Chang, Los Altos, Calif.

[73] Assignee: Electric Power Research Institute, Inc., Palo Alto, Calif.

[*] Notice: This patent is subject to a terminal disclaimer.

[21] Appl. No.: 09/218,802

[22] Filed: Dec. 21, 1998

Related U.S. Application Data

[63] Continuation-in-part of application No. 09/009,571, Jan. 20, 1998, Pat. No. 5,948,143.

[51] Int. Cl.$^7$ .................................................. B01D 53/04
[52] U.S. Cl. ............................ 95/134; 55/302; 95/148; 95/280; 96/144; 96/146; 96/154
[58] Field of Search ............................ 95/134, 133, 148, 95/280; 55/285, 302; 96/134, 135, 140, 141, 143, 144, 146, 154

[56] References Cited

U.S. PATENT DOCUMENTS

| | | | |
|---|---|---|---|
| 2,215,323 | 9/1940 | Guthrie | 96/146 |
| 3,608,273 | 9/1971 | Fabuss et al. | 95/148 |
| 3,693,323 | 9/1972 | Gant | 55/72 |
| 4,419,107 | 12/1983 | Roydhouse | 55/5 |
| 4,889,698 | 12/1989 | Moller et al. | 95/134 |
| 5,141,724 | 8/1992 | Audeh | 423/210 |
| 5,409,522 | 4/1995 | Durham | 75/670 |
| 5,419,884 | 5/1995 | Weekman et al. | 95/134 |
| 5,505,766 | 4/1996 | Chang | 95/134 |
| 5,628,819 | 5/1997 | Mestemaker et al. | 96/143 |
| 5,948,143 | 9/1999 | Sjostrom et al. | 95/134 |

FOREIGN PATENT DOCUMENTS

| | | | |
|---|---|---|---|
| 2932274 | 2/1981 | Germany | 95/134 |

*Primary Examiner*—Duane S. Smith
*Attorney, Agent, or Firm*—William S. Galliani; Pennie & Edmonds LLP

[57] ABSTRACT

An apparatus and method are described for removing vapor phase contaminants from a gas stream by placing a porous element having a sorbent material into ductwork through which the gas stream passes. In a first mode of operation, vapor phase contaminants are adsorbed by the sorbent. In a second mode of operation, the porous element is cleaned of any accumulated deposits, for example fly ash, while in place without having to stop the gas flow. In a third mode of operation, the sorbent can be regenerated in place and without having to stop the gas flow by heating and collecting the desorbed contaminants. This invention is particularly suited for the removal of vapor phase mercury from flue gas generated by a combustion process.

19 Claims, 4 Drawing Sheets

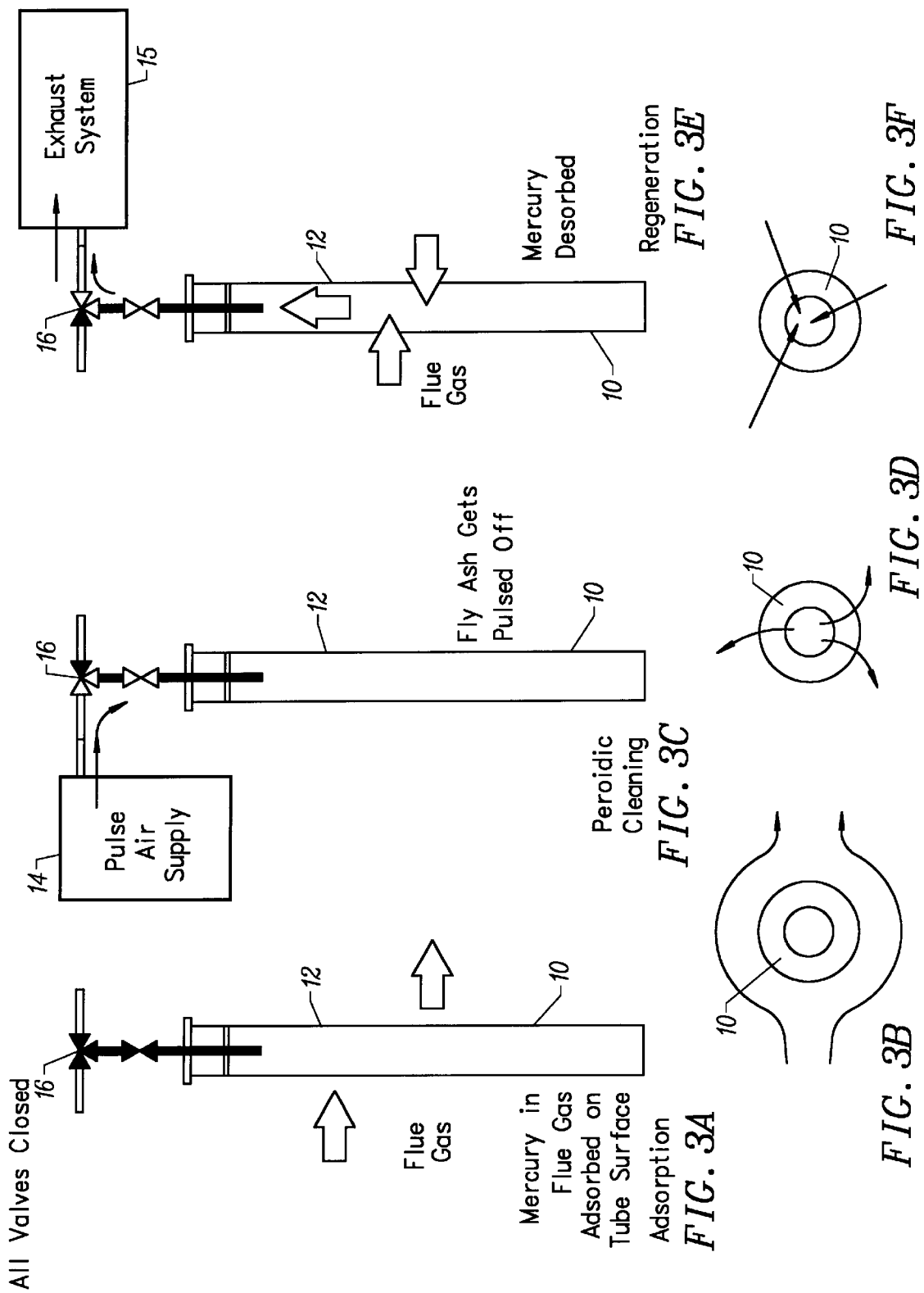

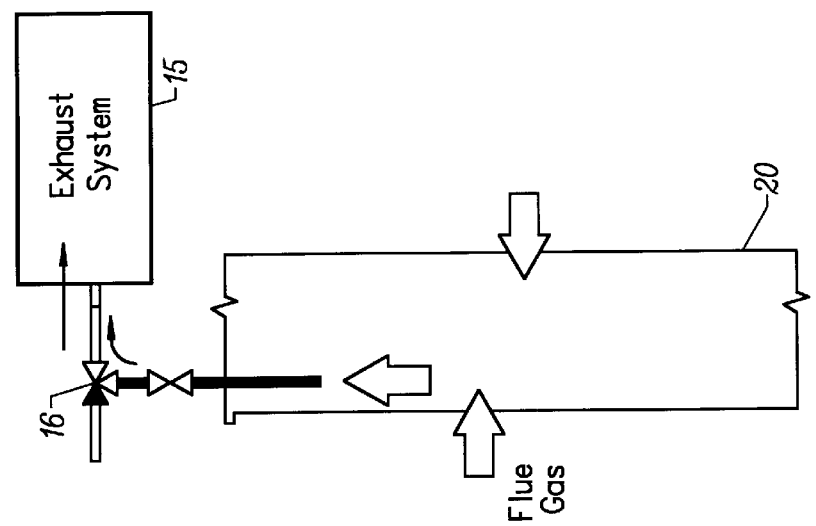
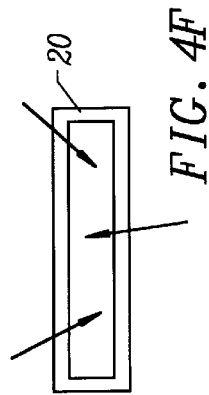
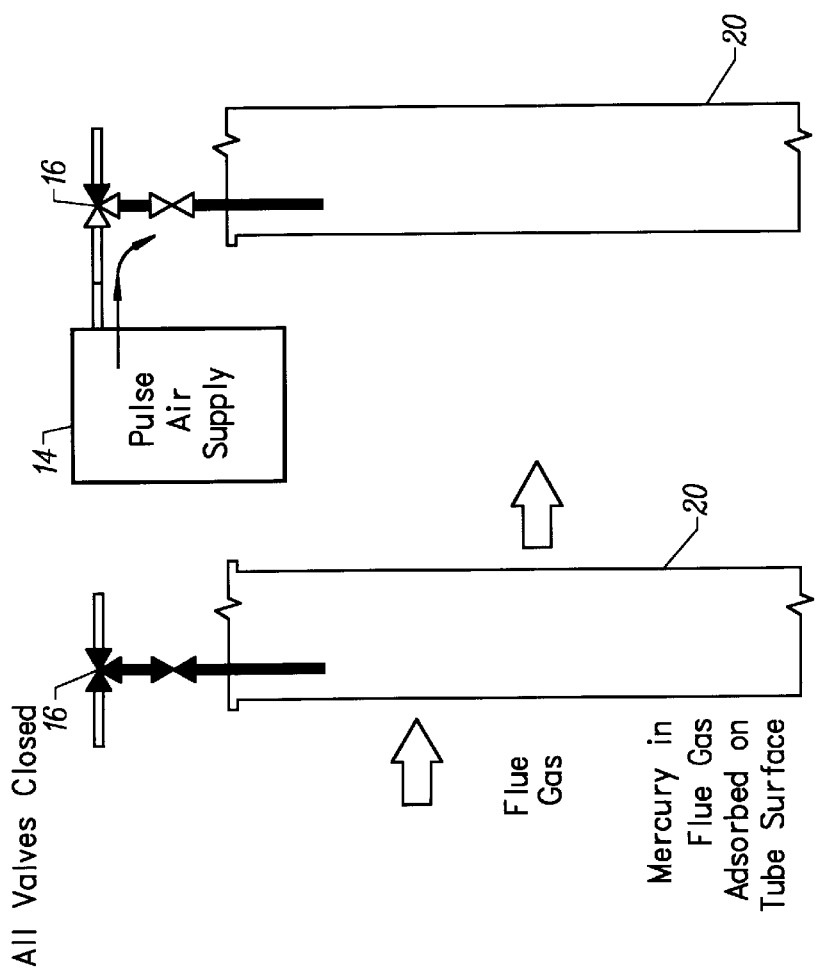
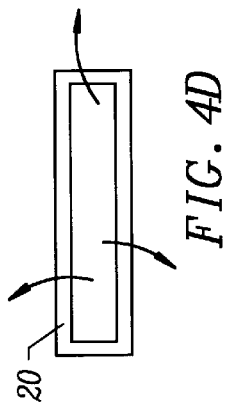
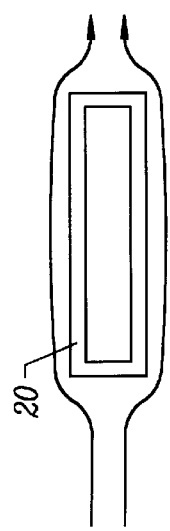

APPARATUS AND METHOD FOR THE REMOVAL OF CONTAMINANTS IN GASES

This application is a continuation-in-part of the application entitled "Apparatus and Method for the Removal of Contaminants in Gases", Ser. No. 09/009,571, filed Jan. 20, 1998, now issued as U.S. Pat. No. 5,948,143.

BACKGROUND OF THE INVENTION

1. Field of Invention

This invention relates generally to the removal of vapor phase contaminants from a gas stream. More particularly, this invention relates to the removal of trace amounts of vapor phase air toxics, such as mercury, from the flue gas of a combustion process.

2. Description of the Related Art

The 1990 Clean Air Act Amendments, Title III, require major sources of air emissions to limit the discharge of certain chemical species. Certain of these chemical species are categorized as air toxics, and major sources are required to limit emissions to 10 tons per year for any given air toxin. Certain of these species may be present in the flue gas emitted from combustion processes, and therefore, cost-effective methods for controlling emissions of these species are of significant interest to the operators of these processes.

Air toxics and other species regulated by the 1990 Clean Air Act Amendments can be distributed in both the vapor phase and the solid phase in the flue gas from a combustion process. Typically the air toxics are concentrated in the solid phase or particulate matter and can be effectively removed by the use of a particulate collection device such as an electrostatic precipitator or fabric filter. Air toxics, such as mercury, that are present in the vapor phase are typically found in very low concentrations, for example, parts per million or less, making removal difficult.

Several approaches are currently being evaluated to remove mercury from gas streams. These techniques involve injecting sorbents into the gas stream before a particulate collection device, passing the gas stream through a fixed or fluidized sorbent bed or structure, or using a wet scrubbing system.

Approaches using fixed bed technologies normally pass the mercury containing gas through a bed consisting of sorbent particles or various structures such as honeycombs, screens and fibers that are coated with sorbents. Common sorbents include activated carbon and noble metal such as gold and silver. In many cases where noble metals are used, only the surface layer of the structure is coated with the noble metal sorbent while the structure itself is made of ceramic or metallic materials. The sorbents on these fixed structures can be periodically regenerated by heating the structure and driving off the adsorbed mercury. The mercury driven off can be recovered or removed separately.

There are, however, several disadvantages of such fixed bed systems. Gas streams such as those from power plant coal combustion contain significant fly ash which can plug the bed structures and thus the beds need to be removed frequently from operation for cleaning. Alternatively, these beds must be located downstream of a separate particulate collector. The beds must be taken off line periodically for regeneration, thereby necessitating a second bed to remain on-line while the first one is regenerating. These beds also require significant space and are very difficult to retrofit into existing systems. For example, retrofitting such a system into the existing ductwork of a power plant could require major structural modifications.

In view of the foregoing, there exists a need for an improved method for removing vapor phase contaminants, such as mercury, from a gas stream.

SUMMARY OF THE INVENTION

An apparatus and method are described for removing vapor phase contaminants from a gas stream by placing a porous element containing a sorbent material into ductwork through which the gas stream is passing. The porous element may be shaped as a plate or a tube. In a first mode of operation, vapor phase contaminants are adsorbed by the sorbent. In a second mode of operation, the porous element is cleaned of any accumulated deposits, for example fly ash, while in place without having to stop the gas flow by back pulsing the tube. In a third mode of operation, the sorbent can be regenerated in place and without having to stop the gas flow by heating and collecting the desorbed contaminants. This invention is particularly suited for the removal of vapor phase mercury from flue gas generated by a combustion process.

This invention circumvents significant problems associated with typical fixed bed mercury adsorption systems. Because the porous elements can be cleaned on-line, they do not need to be removed for cleaning. On-line cleaning also obviates the need for a separate particulate collector as is sometimes used upstream of some fixed bed systems to avoid the need to clean accumulated deposits. The ability to regenerate the sorbent on-line avoids the need for a second fixed bed that is typically used while the first bed is being regenerated. In addition, the present invention requires little or no additional space for installation. All of these advantages can result in significant capital and operating cost savings.

BRIEF DESCRIPTION OF THE DRAWINGS

FIGS. 3(a)–3(f) illustrate three operating modes of an apparatus for removing vapor phase contaminants from a gas stream in accordance with an embodiment of the present invention.

FIGS. 4(a)–4(f) illustrate three operating modes of an apparatus for removing vapor phase contaminants from a gas stream in accordance with a porous plate embodiment of the present invention.

DETAILED DESCRIPTION OF THE INVENTION

Figure 1:
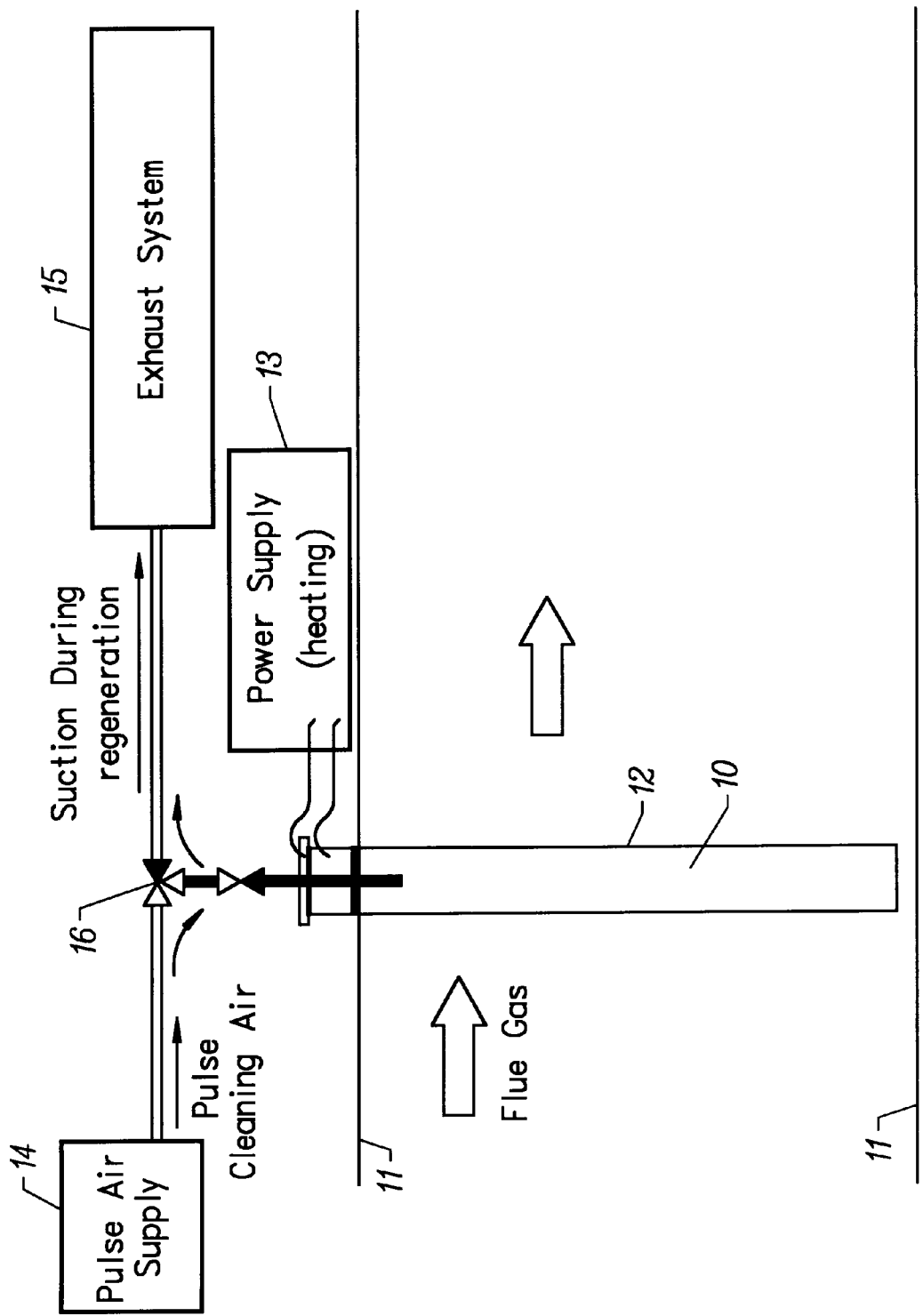
FIG. 1 is a side view of an apparatus for removing vapor phase contaminants from a gas stream in accordance with an embodiment of the present invention.
Figure 2:
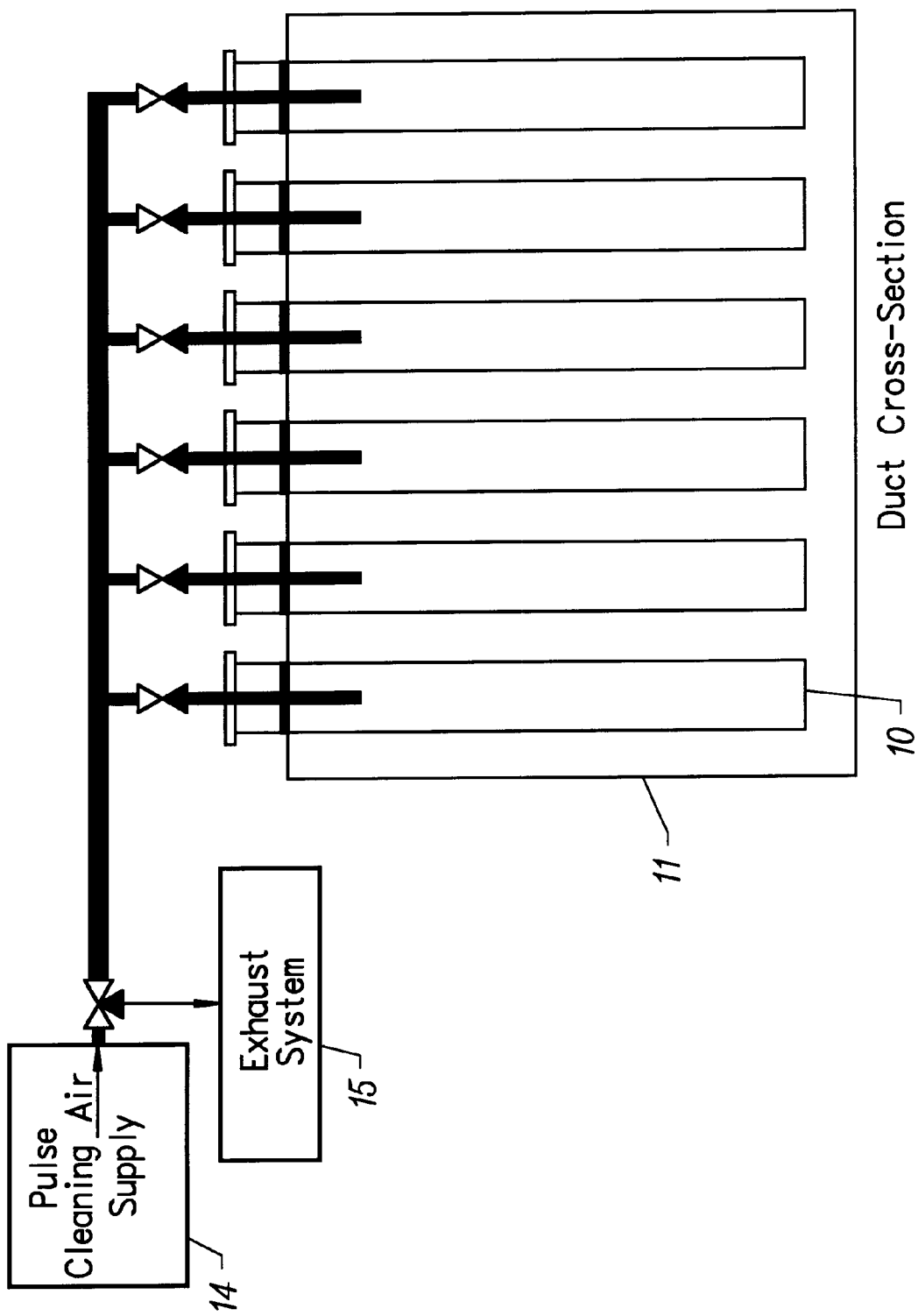
FIG. 2 is a sectional view of an apparatus for removing vapor phase contaminants from a gas stream in accordance with an embodiment of the present invention.

FIG. 1 shows a porous hollow element (10) extending into a duct (11) through which flue gas is passed. The porous hollow element (10) may be shaped as a tube, a plate, or the like. FIG. 1 illustrates the porous hollow element (10) implemented as a tube. The porous tube (10) is coated with a sorbent (12), such as activated carbon, capable of adsorbing vapor phase contaminants, such as mercury. A power supply (13) is connected to the porous tube (10) to provide power for heating the porous tube (10). A pulse air supply (14) is connected to the porous tube (10) to allow pulse air to pass into the interior of the porous tube (10) and through the wall of the porous tube (10) into duct (11). An exhaust system (15) is connected to the porous tube (10) to allow gas inside the duct (11) to pass through the wall of the porous tube (10) to the exhaust system (15). Both the pulse air supply (14) and the exhaust system (15) are connected to the porous tube (10) with the use of a three-way valve (16). It should be appreciated that the pulse air supply (14) and the exhaust system (15) can be connected to the porous tube (10) in any manner as long as there is a mechanism to control gas flow from the pulse air supply (14) and to the exhaust system (15). FIG. 2 shows a sectional view of multiple porous tubes (10) all connected to the same pulse air supply (14) and exhaust system (15).

FIGS. 3(a)–3(f) show three operating modes of the present invention. For each mode, a side view and a top view of the porous tube (10), and tubing and valving associated with the pulse air supply (14) and the exhaust system (15), is shown. In addition, the direction of flue gas flow and pulse air flow is shown. FIGS. 3(a) and 3(b) illustrate adsorption of the vapor phase contaminant. FIGS. 3(c) and 3(d) illustrate periodic cleaning of the porous tube (10) using pulse air. FIGS. 3(e) and 3(f) illustrate regeneration of sorbent (12).

In operation and use, the method of the present invention comprises the steps of adsorbing the vapor phase contaminant from the gas stream, using pulse air to clean the porous tube (10) and regenerating the sorbent (12). It should be appreciated that these steps can be performed in any order and at any time, and conventional control methods can be used to regulate when these steps are performed and the duration for each. It should be appreciated that multiple porous tubes (10) can be used to provide for greater contact between the contaminants and the sorbent (12) to enhance the adsorption efficiency and to allow continued adsorption while some porous tubes (10) are either cleaned or regenerated. Conventional control methods can also be used to regulate which porous tubes (10) are operating in which mode, at what time and for what duration.

Further, it should be appreciated that the present invention can be used to remove many different vapor phase contaminants; however, the process is particularly suited for the removal of vapor phase mercury from the flue gas of a combustion process. Therefore, but without limiting the application and uses of the present invention for the removal of other vapor phase contaminants and for other gas streams, the description that follows is directed to the specific use of the present invention for the removal of vapor phase mercury from a flue gas of a combustion process.

To adsorb vapor phase mercury from a flue gas, the porous tube (10), which is coated with a sorbent (12) such as gold, silver, activated carbon and selenium, is placed into the ductwork (11) transporting the flue gas. The porous tube (10) can be located anywhere in the duct (11) where vapor phase contaminant removal can be optimized, including the stack of the combustion process. During adsorption, no gas will actually flow through the porous tube (10) as all outlets to it are closed. Mercury is adsorbed by the sorbent (12) coated on the surface of the porous tube (10) as the flue gas passes by the porous tube (10). This is shown in FIGS. 3(a) and 3(b) as adsorption. It should be appreciated that any sorbent can be used and that any method for coating the porous tube (10) with such sorbent can be used. Further, it may be possible to make the porous tube (10) out of a material that itself acts as a sorbent, such as activated carbon. The porous tube (10), however, should be made of a material capable of withstanding the flue gas environment in which it is located.

As the surface of the porous tube (10) gets fouled with dust particles from the gas stream, a periodic back pulse of air is released into the porous tube (10) to knock the dust off the outside of the porous tube (10). This is accomplished by using pulse air supply (14). The three-way valve (16) is opened to allow pulse air, which is supplied at a higher pressure than the flue gas by pulse air supply (14), to flow from the interior of the porous tube (10), through its wall and into the flue gas, thereby dislodging accumulated dust particles. This is shown in FIGS. 3(c) and 3(d) as periodic cleaning. It should be appreciated that other methods of supplying a stream of air into the interior of the porous tube (10), such as a reverse flow of air, can also be used.

As the surfaces of the sorbent (12) become saturated from the adsorption of mercury, the porous tube (10) can be regenerated without removing it from the duct (11) or without having to divert the flue gas flow. This is accomplished by electrically heating the porous tube (10) using the power supply (13) either by direct electrical conduction through the tube or by indirect heating through electrical heating elements. It should be appreciated that other means of heating the porous tube (10), such as the use of microwave energy or passage of a hot gas stream through the tubes, may also be used. While heating, suction is applied to the inside of the porous tube (10) using the exhaust system (15). This suction will pull flue gas through the wall of the porous tube (10) and be sent to the exhaust system (15). Mercury will desorb from the sorbent (12) during heating and will be collected by the exhaust system (15). This is shown in FIGS. 3(e) and 3(f) as regeneration. It should be appreciated that the exhaust system (15) can be any method for recovering vapor phase contaminants from a small gas stream. For example, in the case of mercury, the exhaust system (15) can be a condenser that condenses the vapor phase mercury for collection and disposal.

The foregoing has described a porous hollow element (20) shaped as a tube. The porous hollow element (20) may also be shaped as a porous plate with a hollow interior. In this embodiment, the porous plate is aligned with the gas flow so that the gas impinges on a narrow side of the plate, and then traverses the length of the plate, as shown in FIG. 4(b). As with the embodiment shown in FIG. 2, the porous plate embodiment is typically used with a set of porous plates positioned in a duct.

FIG. 4(a) is a side view of a porous plate (20), and tubing and valving associated with the pulse air supply (14) and the exhaust system (15) for an adsorption mode of operation. FIG. 4(b) shows a top view of the porous plate (20) during adsorption mode. FIGS. 4(c) and 4(d) illustrate a porous plate (20) used in a periodic cleaning mode with pulsed air. FIGS. 4(e) and 4(f) illustrate the use of the porous plate (20) in a regeneration mode.

An apparatus and method for removing vapor phase contaminants from a gas stream has been described. The present invention has significant advantages over conventional fixed bed systems and other methods for removing vapor phase contaminants.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. An apparatus for removing a vapor phase contaminant from a gas stream, said apparatus comprising:
   a duct through which a gas stream is passed;
   a porous hollow element having a sorbent material connected to said duct and extending into the interior of said duct;
   a heating supply connected to said porous hollow element;
   a cleaning gas supply connected to said porous hollow element; and
   an exhaust system connected to said porous hollow element.

2. The apparatus of claim 1 wherein said porous hollow element is coated with said sorbent material.

3. The apparatus of claim 1 wherein said porous hollow element is substantially composed of said sorbent material.

4. The apparatus of claim 1 wherein said sorbent material is selected from the group consisting of activated carbon, silver, selenium and gold.

5. The apparatus of claim 1 wherein said heating supply comprises a power supply in direct electrical connection with said porous hollow element.

6. The apparatus of claim 1 wherein said heating supply comprises a source of microwave energy directed to said porous hollow element.

7. The apparatus of claim 1 wherein said cleaning gas supply comprises a uniform reverse gas flow.

8. The apparatus of claim 1 wherein said cleaning gas supply comprises a pulse gas supply.

9. The apparatus of claim 1 wherein said exhaust system comprises a condenser.

10. The apparatus of claim 1 wherein said exhaust system comprises an absorber.

11. The apparatus of claim 1 wherein said porous hollow element is shaped like a tube.

12. The apparatus of claim 1 wherein said porous hollow element is shaped like a plate.

13. A method for removing a vapor phase contaminant from a gas stream in a duct, said method comprising the steps of:
    adsorbing a vapor phase contaminant onto a sorbent material on a porous hollow element;
    cleaning said porous hollow element while the gas stream continues to flow in the duct;
    regenerating said sorbent material while the gas stream continues to flow in the duct by heating said sorbent material and passing a portion of the gas stream into the interior of said porous hollow element and out of the duct; and
    collecting said vapor phase contaminant from said portion of the gas stream.

14. The method of claim 13 wherein said cleaning step includes the step of cleaning said porous hollow element by passing a cleaning gas from the exterior of the duct to the interior of said porous hollow element and through the wall of said porous hollow element into the duct.

15. The method of claim 14 wherein said cleaning step includes the step of cleaning said porous hollow element by passing a cleaning gas in pulses from the exterior of the duct to the interior of said porous hollow element and through the wall of said porous hollow element into the duct.

16. The method of claim 13 wherein said regenerating step includes the step of regenerating said sorbent material by heating said sorbent material electrically.

17. The method of claim 13 wherein said regenerating step includes the step of regenerating said sorbent material by heating said sorbent material by directing microwave energy to said porous hollow element.

18. The method of claim 13 wherein said collecting step includes the step of collecting said vapor phase contaminant by condensing said vapor phase contaminant.

19. The method of claim 13 wherein said collecting step includes the step of collecting said vapor phase contaminant by absorbing said vapor phase contaminant.

* * * * *